(12) United States Patent
Abbott et al.

(10) Patent No.: US 7,822,641 B2
(45) Date of Patent: Oct. 26, 2010

(54) METHOD AND APPARATUS FOR MONITORING GAME PLAY

(75) Inventors: Eric L. Abbott, Las Vegas, NV (US); Rolland N. Steil, Las Vegas, NV (US)

(73) Assignee: IGT, Reno, NV (US)

( * ) Notice: Subject to any disclaimer, the term of this patent is extended or adjusted under 35 U.S.C. 154(b) by 149 days.

(21) Appl. No.: 11/132,955

(22) Filed: May 19, 2005

(65) Prior Publication Data
US 2006/0281537 A1    Dec. 14, 2006

(51) Int. Cl.
A63F 9/24    (2006.01)

(52) U.S. Cl. .......................... 705/25; 463/16

(58) Field of Classification Search .............. 463/12, 463/13, 16, 23, 25, 29, 46, 47; 273/148 R, 273/309, 149 R, 292
See application file for complete search history.

(56) References Cited

U.S. PATENT DOCUMENTS

| | | | |
|---|---|---|---|
| 4,531,187 A | | 7/1985 | Uhland |
| 4,814,589 A | | 3/1989 | Storch et al. |
| 5,166,502 A | | 11/1992 | Rendleman et al. |
| 5,361,885 A | | 11/1994 | Modler |
| 5,406,264 A | | 4/1995 | Plonsky et al. |
| 5,651,548 A | | 7/1997 | French et al. |
| 5,722,893 A | | 3/1998 | Hill et al. |
| 5,735,742 A | | 4/1998 | French |
| 5,785,321 A | | 7/1998 | van Putten et al. |
| 5,803,808 A | | 9/1998 | Strisower |
| 5,809,482 A | | 9/1998 | Strisower |
| 5,890,717 A | | 4/1999 | Rosewarne et al. |
| 5,919,090 A | * | 7/1999 | Mothwurf .................... 463/25 |
| 5,941,769 A | | 8/1999 | Order |
| 5,957,776 A | | 9/1999 | Hoehne |
| 6,039,650 A | * | 3/2000 | Hill .............................. 463/47 |
| 6,165,069 A | * | 12/2000 | Sines et al. .................... 463/12 |
| 6,186,895 B1 | | 2/2001 | Oliver |

(Continued)

FOREIGN PATENT DOCUMENTS

WO    WO 00/22585    4/2000

(Continued)

OTHER PUBLICATIONS

TCS John Huxley, Protec 21 Blackjack Security, 2005, 2 pages.

(Continued)

Primary Examiner—Pierre E Elisca
(74) Attorney, Agent, or Firm—Armstrong Teasdale LLP

(57) ABSTRACT

A bet detection system which may execute on a computer based processing device is disclosed for use with DID tokens to detect unwanted or unfair betting patterns by players. The system utilizes a table equipped with DID token detection antenna associated with the one or more bet spots for the player positions. DID token antenna may detect DID tokens at the dealer position, other bet spots, or chip trays. A dealer interface allows the dealer to provide the game data to the detection system. The detection system processes the game data and the bet data, such as bet amount for the players. Based on this processing, bet patterns may be generated for the players and in relation to deck penetration information, deviations in bet patterns may be detected and appropriate notification provided.

39 Claims, 5 Drawing Sheets

U.S. PATENT DOCUMENTS

| | | |
|---|---|---|
| 6,267,671 B1 | 7/2001 | Hogan |
| 6,299,536 B1 | 10/2001 | Hill |
| 6,460,848 B1 | 10/2002 | Soltys et al. |
| 6,464,584 B2 | 10/2002 | Oliver |
| 6,514,140 B1 * | 2/2003 | Storch .................. 463/25 |
| 6,517,435 B2 | 2/2003 | Soltys et al. |
| 6,517,436 B2 | 2/2003 | Soltys et al. |
| 6,520,857 B2 | 2/2003 | Soltys et al. |
| 6,527,271 B2 | 3/2003 | Soltys et al. |
| 6,530,836 B2 | 3/2003 | Soltys et al. |
| 6,530,837 B2 | 3/2003 | Soltys et al. |
| 6,533,276 B2 | 3/2003 | Soltys et al. |
| 6,533,662 B2 | 3/2003 | Soltys et al. |
| 6,561,897 B1 | 5/2003 | Bourbour et al. |
| 6,579,180 B2 | 6/2003 | Soltys et al. |
| 6,579,181 B2 | 6/2003 | Soltys et al. |
| 6,581,747 B1 | 6/2003 | Charlier et al. |
| 6,582,301 B2 | 6/2003 | Hill |
| 6,595,857 B2 | 7/2003 | Soltys et al. |
| 6,609,710 B1 | 8/2003 | Order |
| 6,612,928 B1 | 9/2003 | Bradford et al. |
| 6,619,662 B2 | 9/2003 | Miller |
| 6,626,757 B2 | 9/2003 | Oliveras |
| 6,629,019 B2 | 9/2003 | Legge et al. |
| 6,629,591 B1 | 10/2003 | Griswold et al. |
| 6,629,889 B2 | 10/2003 | Mothwurf |
| 6,638,161 B2 | 10/2003 | Soltys et al. |
| 6,652,379 B2 | 11/2003 | Soltys et al. |
| 6,659,875 B2 | 12/2003 | Purton |
| 6,663,490 B2 | 12/2003 | Soltys et al. |
| 6,671,358 B1 | 12/2003 | Seidman et al. |
| 6,685,564 B2 | 2/2004 | Oliver |
| 6,685,568 B2 | 2/2004 | Soltys et al. |
| 6,688,979 B2 | 2/2004 | Soltys et al. |
| 6,690,673 B1 | 2/2004 | Jarvis |
| 6,709,333 B1 | 3/2004 | Bradford et al. |
| 6,712,696 B2 | 3/2004 | Soltys et al. |
| 6,733,388 B2 | 5/2004 | Mothwurf |
| 6,747,560 B2 | 6/2004 | Stevens, III |
| 6,758,751 B2 | 7/2004 | Soltys et al. |
| 6,834,251 B1 | 12/2004 | Fletcher |
| 6,843,725 B2 | 1/2005 | Nelson |
| 6,848,994 B1 | 2/2005 | Knust et al. |
| 6,967,563 B2 | 11/2005 | Bormaster |
| 7,018,291 B1 | 3/2006 | Lemke et al. |
| 7,152,045 B2 | 12/2006 | Hoffman |
| 7,172,507 B2 | 2/2007 | Fujimoto et al. |
| 2003/0064798 A1 * | 4/2003 | Grauzer et al. ............. 463/29 |
| 2003/0195025 A1 | 10/2003 | Hill |
| 2005/0082750 A1 | 4/2005 | Grauzer et al. |
| 2005/0219599 A1 | 10/2005 | White et al. |
| 2005/0225080 A1 | 10/2005 | Wicker |
| 2006/0177109 A1 | 8/2006 | Storch |
| 2007/0026204 A1 | 2/2007 | Caulley et al. |
| 2007/0029394 A1 | 2/2007 | Wicker et al. |
| 2007/0035399 A1 | 2/2007 | Hecht et al. |
| 2007/0057469 A1 | 3/2007 | Grauzer et al. |
| 2007/0060311 A1 | 3/2007 | Rowe et al. |
| 2010/0048302 A1 * | 2/2010 | Lutnick et al. ............. 463/42 |
| 2010/0062840 A1 * | 3/2010 | Herrmann ................. 463/25 |

FOREIGN PATENT DOCUMENTS

| | | |
|---|---|---|
| WO | WO 2006/037220 | 4/2006 |

OTHER PUBLICATIONS

"TableLink™ The New Standard in Table Games"; Mikohn; brochure; 18 pages; 1999.
"TableLink a New Standard in Table Games"; Mikohn; brochure; 4 pages; Date Unknown.
Edward O. Thorp, Beat the Dealer, 1966, pp. 116 and 117.
Bill Zender, Card Counting for the Casino Executive, 1990, pp. 70,72, 74, and 76.
Don Schlesinger, Blackjack Attack Playing the Pros' Way, 3$^{rd}$ Edition—The Ultimate Weapon, 2004, pp. 16, 492, and 493.
International Gaming & Wagering Business, Table Game Trends 2004, 22 pages.
DigiDeal Corporation, Digital 21 "The Classic Game", 2005, 1 page.
Mikohn Gaming Corporation, Tablelink Total View the New Standard in Table Games, 2005, 11 pages.

* cited by examiner

METHOD AND APPARATUS FOR MONITORING GAME PLAY

FIELD OF THE INVENTION

The invention relates to wagering game monitoring, and in particular to a method and apparatus for monitoring game play based on wager amounts and patterns.

RELATED ART

Gambling has become a popular form of entertainment in the United States and in numerous foreign countries. Although numerous wagering events are offered within the casino or other gaming environments, one of the most traditional and popular forms of wagering occurs at table games. As is widely understood, table games often utilize a playing surface, often called a felt, upon which a dealer or other game operator offers a wagering event to one or more players. Blackjack is the most common table game. Other games classified as traditional table games may include roulette, craps, and other games which use dice, wheels, or cards or any combination of dice, wheels, or cards. Traditional table games include games of chance that use cards or dice, and tokens, such as chips of a differing value of currency.

Casinos in countries other than the United States will use different currency. Traditional table games also include proprietary games such as Caribbean Stud Poker® which includes a progressive jackpot. Other proprietary traditional table games include games such as Three Card Poker™, Royal Match 21® and Texas Hold'em BonuS™. Proprietary traditional table games are table games for which a casino will lease or purchase from a manufacturer because the proprietary traditional table game is protected by the intellectual property of the manufacturer. The term "traditional table game" is used to distinguish from products offered by TableMAX®and Digideal's Digital 21® which use video representations of cards. There are other non-traditional table games which have digital roulette wheels with video or digital images of dealers.

As compared to slot or video type games, traditional table games offer greater excitement for some players, including group play, and these games often attract big money players, which can result in larger profit margins for the casino. Slots or video type games often integrate a player tracking system that allows a computerized gaming network to monitor a player's participation, such as how often a player plays and how much a particular player wagers. In a table game environment however, it is often difficult to track how much money a player wagers and thus, it is difficult to accurately provide complimentary gifts or reward good customers to encourage a return to a particular property.

Table games have a built-in house advantage as part of the mathematics of the game. Because table games are not computer controlled and not bound by the rigid software controlled routines, certain types of table games can be targets for players intending to gain an unfair advantage. One such example of this comprises sophisticated techniques such as card counting in a game such as blackjack. Card counting may turn the advantage from the house to the player. Thus, dealers or game operators may have difficulty offering the game in the intended manner.

To overcome these drawbacks, numerous game monitoring systems for traditional table games have been developed. These game monitoring systems combine tracking of the cards with the tracking of the amount bet through RFID (radio frequency identification) to determine if players are counting cards to gain an advantage over the house. The main goal of card counting is for the player to increase the bet amount based on what cards have already been in play so that the remaining cards to be dealt are favorable to the player. While these proposed prior art systems provide potentially the most accurate monitoring capability, such prior art systems can be undesirably complex and expensive. In addition, each piece of additional gaming equipment added to a table game creates delays in time to market because of necessary gaming regulatory approvals. Due to the presence of a myriad of human game protection elements employed in a casino with traditional table games, such as pit bosses, dealers, video surveillance and the like, a system having 100% detection accuracy regarding card counting is not necessary.

The invention described and claimed below overcomes these drawbacks and provides additional benefits.

SUMMARY

To overcome the drawback in the prior art and to provide additional benefits and advantages as described herein, a system for monitoring player betting during play of a table game is disclosed. In one embodiment one or more bet spots, such as may be found on a table, are configured to receive a bet and one or more antenna are associated with the one or more bet spots. The one or more antenna are configured to detect a bet within a detection zone. Also provided is a dealer interface configured to accept input to create game data and a reader configured to receive one or more signals from the one or more antenna. A processor is configured to receive the one or more signals from the interface and reader, and is also further configured with machine readable code. The machine readable code is configured to determine deck penetration and determine betting patterns for one or more players. The machine readable code is also configured to detect changes in betting patterns for one or more players in relation to deck penetration and to generate a flag in response to changes in betting patterns for one or more players in relation to deck penetration.

In one embodiment, the dealer interface comprises a shuffle button and a new game button operated by the dealer. The dealer interface may further comprise a player tracking interface. In one embodiment, the bet is placed using a token configured with radio frequency identification. Deck penetration may be determined based on a number of players per game multiplied by a number of games since each shuffle multiplied by an average number of cards dealt per player per game. Furthermore, the machine readable code may round a bet to a multiple of a table minimum. In one embodiment, the dealer interface receives input from an automatic card shuffler.

Also disclosed herein is a bet detection system for use with a table game comprising one or more antenna for receiving token data from two or more DID equipped tokens and a dealer interface for generating game data. Also part of this embodiment is a processor configured to execute machine readable code to process the token data and the game data. The processor executes machine readable code configured to track the deck penetration, to track a player's bet deviation, and to compare a player's bet deviation to a threshold value responsive to deck penetration.

In one embodiment, the token data comprise a token value and the token value may have a value in a currency. In addition, the one or more antenna may be configured to send an excitation signal and receive a response from the DID equipped tokens. As used herein, the term deck penetration may be based on the mathematical calculation of the number of cards played and the average of the number of cards used for each hand. The term bet deviation may comprise variations from the player's average bet. In one embodiment, the player's bet deviation comprises variations from the player's average bet calculated after a predetermined deck penetration. It is contemplated that the game data may comprise data indicating a new game and data indicating a shuffle.

Also disclosed herein is a method for monitoring unwanted betting patterns during one or more wagering events on a table game. This may comprise detecting one or more bet amounts of one or more bets by one or more players and also receiving game data. As part of this method, the system also processes the bet amount and the game data to determine a bet amount pattern for at least one of the one or more players and processing at least the game data to determine deck penetration. Then, the method may process the bet amount pattern for at least one player in relation to the deck penetration to detect unwanted betting patterns by at least one player.

In one embodiment, the step of detecting the one or more bet amounts comprises reading data from a RFID equipped token. In one embodiment, the game data comprises data regarding number of hands dealt since last shuffle. The step of processing at least the game data to determine deck penetration may comprise processing the following data: average cards dealt per hand, number of players dealt hands per game, and the number of games. At least some game data may be received from an input from an automatic card shuffler.

The method may further comprise identifying at least one player. In one embodiment, this may comprise use of a card which contains information identifying at least the player's name. In another embodiment, this may comprise the use of a biometric method of identifying players. Furthermore, the method may comprise comparing a player's biometric information against biometric information of player's whom a casino seeks to exclude from playing table games.

Also disclosed herein is a monitoring of betting during play of wagering events on a table game comprising a wagering event using DID tokens and a DID token detecting gaming tables interfaced to a detection system having machine readable code. The code may be configured to process signals generated by DID token reading. The method also tracks DID tokens bet during play and associating DID tokens bet with a particular player. As part of the method, calculations on the one or more types of players wagering data may comprise total amount bet during game play, total amount lost during game play, and/or total amount won during game play. The method may then compare the player wagering data to one or more thresholds and responsive to the comparing, generate one or more notifications regarding the player wagering data. These notifications may be automatically sent electronically.

In one variation, the DID tokens comprise tokens equipped with radio frequency identification capability. Furthermore, the tracking of DID tokens provided to a player from a dealer comprises providing DID tokens from a token tray configured to read DID tokens to a player. In one embodiment, the step of automatically electronically sending comprises sending the one or more notifications using e-mail messages via a wireless communication link. For example, the person notified may depend on the type of notification. In one instance, for a player identified as poorly skilled, a casino host is notified. In another instance, a gaming regulatory agency has direct access to any notifications. For example, automatically electronically sending may comprise displaying an alert on a computer screen. It is contemplated that sending the one or more notifications may comprise sending one or more of the following notifications: a notification of a player with large winnings, a player with large losses, or a player with large bets. The method may also comprise tracking DID tokens provided to a player from a dealer and/or tracking DID tokens collected from the player by the dealer. In one embodiment, the table game is blackjack. In one embodiment, the table game is a proprietary table game. In one embodiment, the proprietary table game is Caribbean Stud Poker®. In one embodiment, the proprietary table game is Three Card Poker™. In one embodiment, the proprietary table game is Texas Hold'em BonuS™.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Figure 1:
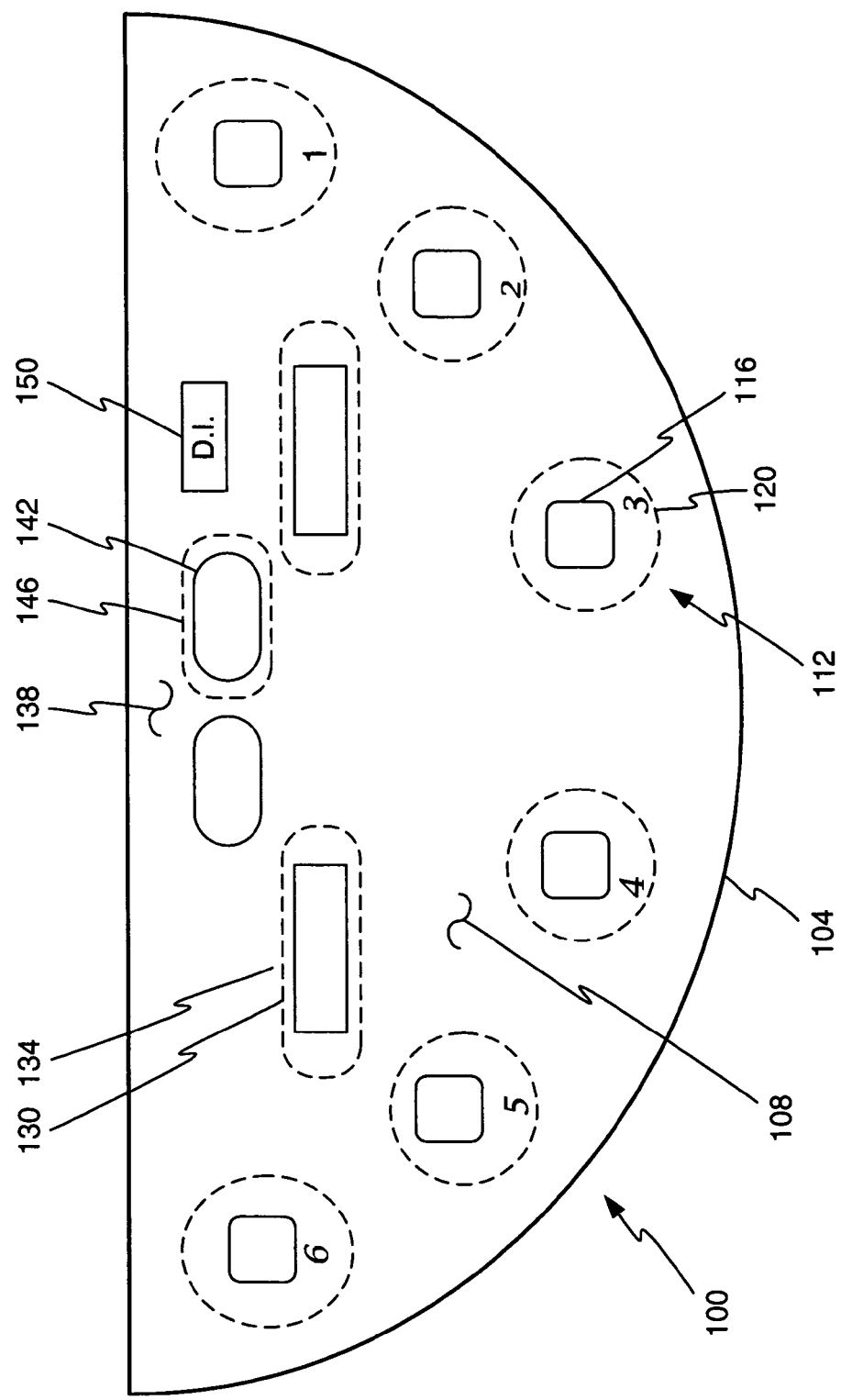
FIG. 1 illustrates a top plan view of an example embodiment of a table for use with a table game.

FIG. 1 illustrates a top plan view of an example embodiment of a gaming table for use with a table game such as blackjack. This is but one possible table arrangement and layout and it is contemplated that one of ordinary skill in the art may arrive at other table arrangements to promote game play or accommodate a greater or fewer number of players. Likewise, table can be configured in a stand-up or sit down arrangement. In this example embodiment the table 100 includes an outer edge 104 surrounding a generally flat top surface 108. The table may also be configured to accommodate other types of table games including, but not limited to, dice games such as a modified form of craps, poker, baccarat, proprietary table games or any other type of game. The term table game is defined to mean any game that is played on a table or for which DID tokens may be used and monitored during play. The term table game encompasses traditional table games, proprietary table games, and any other type of game. The term table game and traditional table game are often used interchangeably herein.

In this example embodiment of a table, arranged on an outer edge 104 of the table 100 are one or more player stations 112 configured for use by a player to participate in a waging game or a game of chance offered at the table such as blackjack. In this embodiment the player stations 112 comprise a bet spot 116 wherein a player may place one or more wagers during the course of play. For example, the player may place the chips or tokens within area 116 when placing a bet during the course of play. Around at least one or more, or each bet spot 116 is a detection zone 120. The detection zone 120 comprises a zone within which a bet detection system, described below, may detect the token, such as an amount bet by a player at a player location 112. Likewise, the simple presence of a bet may also be detected by the bet detection system or other data stored on the token.

In other various embodiments one or more supplemental bet spots may be located in one or more other locations on the table surface 108. By way of example, a supplemental bet spot 130 may be located as shown and shared by more than one player. A supplemental detection zone 134 may likewise be associated with the supplemental bet spot 130 to detect a bet therein. The supplement bet spots may comprise coin buy spots with associated detection. A supplemental detection zone 134 could also be added to detect multiple bets required or optional by player. In one embodiment a supplemental detection zone 134 may be used in proprietary table games such as Caribbean Stud Poker®, Three Card Poker™, Royal Match 21® and Texas Hold'em Bonus.™

In this example embodiment a dealer position 138 is located generally opposite one or more of the player positions. As is generally understood, the dealer presents the game from the dealer station 138. Associated with the dealer station 138 are one or more dealer spots 142 which in turn may be associated with one or more dealer detection zone. The dealer spot is a location on or in some way associated with the table on which or around which chips or tokens may be placed for detection by the detection system. The dealer detection zone 146 is the area in which the detection system can detect tokens placed in the dealer spot 142. This dealer detection zone 146 could be used in player banked traditional table games such as those played in the State of California. The dealer detection zone 146 may also be used to hold ante bets contributed by players in Class II jurisdictions under the Indian Gaming Regulatory Act.

A dealer interface 150 may also be place near the dealer position 138. The dealer interface 150 comprises a user interface configured to allow the dealer to provide input to the detection system and optionally receive input from the detection system. In various embodiments the dealer interface 150 comprises one or more buttons, dials, display screens, lights or other illumination devices, speakers or other audible indicator, or analog dials, potentiometers, or keypads. Through use of the dealer interface 150, the dealer is able to provide input to the detection system to create game data as described below.

Figure 2:
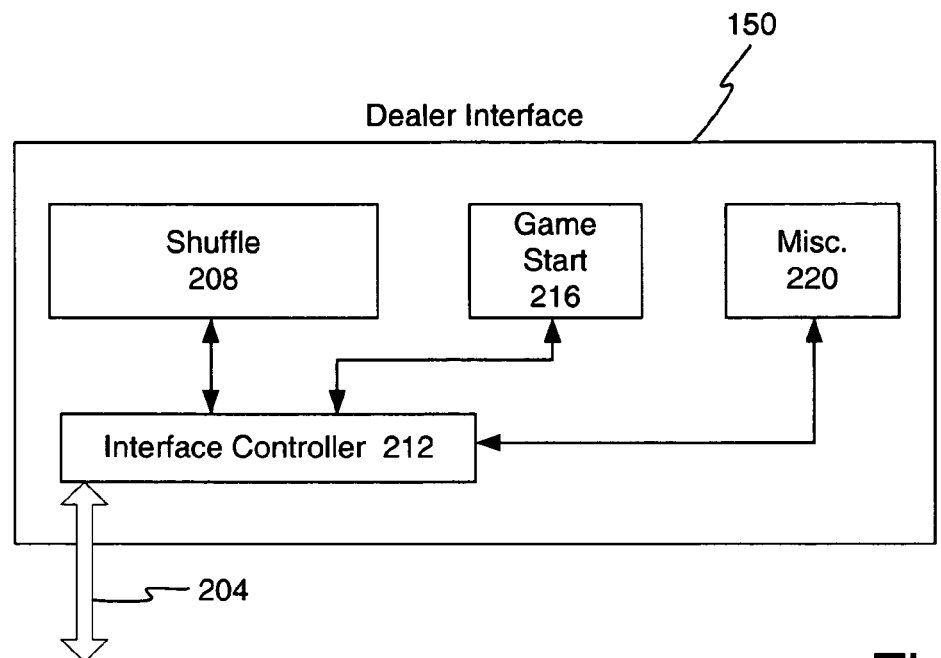
FIG. 2 illustrates a block diagram of an example embodiment of dealer interface.

FIG. 2 illustrates a block diagram of an example embodiment of dealer interface, such as dealer interface 150, shown in FIG. 1. This is but one possible example embodiment and it is contemplated that other embodiments may be created which utilize additional or fewer components and modes of operation. As shown, a dealer interface 150 comprises an input/output port 204 that connects to an interface 212. The interface controller 212 is configured to control input and output from the dealer interface 150 to the detection system. The interface controller 212 may comprise of a micro-controller unit, memory, input and output devices, a predefined instruction set that is setup to allow the dealer to use the interface in a manner conducive to allow input and provide feedback to the dealer, or any other device or element configured to perform as described herein. Connecting to the interface controller 212 are parts of the dealer interface 150 to provide input which create game data which include: a shuffle indicator button 208, a game start button 216, and a one or more other buttons or inputs 220 which may be configured as desired such as an interface to allow an automatic card shuffler such as for example the products sold by Shuffle Master, Inc. of Las Vegas, Nev. to communicate new shuffle data to the interface controller 212.

The shuffle indicator button 208 comprises a dealer input device or indicator that the dealer may utilize to provide an input to the detection system that a shuffle has just occurred or is about to occur. This provides data to the system to signal when dealing from a fresh shoe is about to occur. The game start button 216 comprises a dealer indicator that the dealer may utilize to provide an input to the detection system that a new game is about to begin. As used herein, a game is defined as a dealing of a round of cards or other indicia to the players. In other games, other events may define the start of a new game. It is contemplated that multiple games may occur between shuffles of the deck or decks of cards. In the following proprietary traditional table games one deck of cards is used and there is only one game per shuffle: Caribbean Stud Poker®, Three Card Poker™ and Texas Hold'em Bonus™.

Of course, in embodiments which utilize indicia other than cards, such as games that utilize dice or wheels, other buttons with different labels may be utilized to achieve the method and apparatus as described herein. It is also contemplated that the dealer interface 150 may include a keyboard and/or display to thereby provide means for the dealer to input player information and player position. The dealer interface 150 may also be equipped with player tracking interface to accept and read player tracking cards and to be able to receive number or letter codes or alias for a player. The player tracking interface may lock in a name or code to identify each player using a player location 112 or other indicator. The player tracking interface can be operated by the dealer or pit supervisory personnel, or any other party to provide this Player Lock-In Data. The information supplied by the player tracking interface is also considered an input creating game data.

Figure 3:
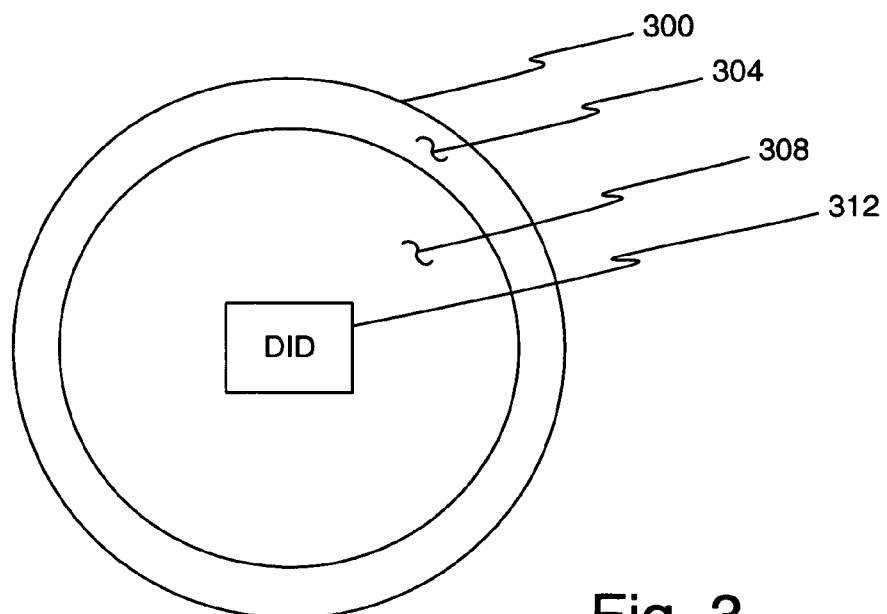
FIG. 3 illustrates a top plan view of a token equipped with detectable identification.

FIG. 3 illustrates a top plan via of a token equipped with detectable identification (hereinafter DID). The term DID is defined to mean any technology that may be associated with the token or in any way imbedded within the token to allow for detection of the token using sensing technology. One example of DID technology is radio frequency identification (RFID) technology wherein an energizable sensor imbedded within a token may be activated using an antenna and/or energy emitting device thereby causing the DID to emit data. RFID tokens are available from Gaming Partners International, located in Las Vegas, Nev.

As shown in FIG. 3, a token 300 comprises an outer surface and edge often formed in a coin shape. An outer rim 304 may be provided with markings and to provide support to the structure of the token 300. Inside the area defined by the outer ring 304 is a middle area 308 of the token 300. The middle area, or other area of the token, includes a DID element 312 that may be configured to identify any type information associated with the token. The information stored or associated with the DID may comprise the value assigned to the token, an identification code or unique serial number, player information, if so assigned, a client or casino name, secret data, encryption information or codes, public information, physical chip size, data regarding memory, creation or in use date, DID type or family, or any other information.

In one example embodiment the token 300 and DID technology 312 comprise a microchip having read and write memory, such as for example 256 bits, with one or more configurable sections to meet the particular application. Data may be entered into the DID device and sealed or encrypted to prevent fraud or tampering. In one embodiment, at least some of the data stored within the DID device may be changed or updated by a casino or when provided to a player.

Figure 4:
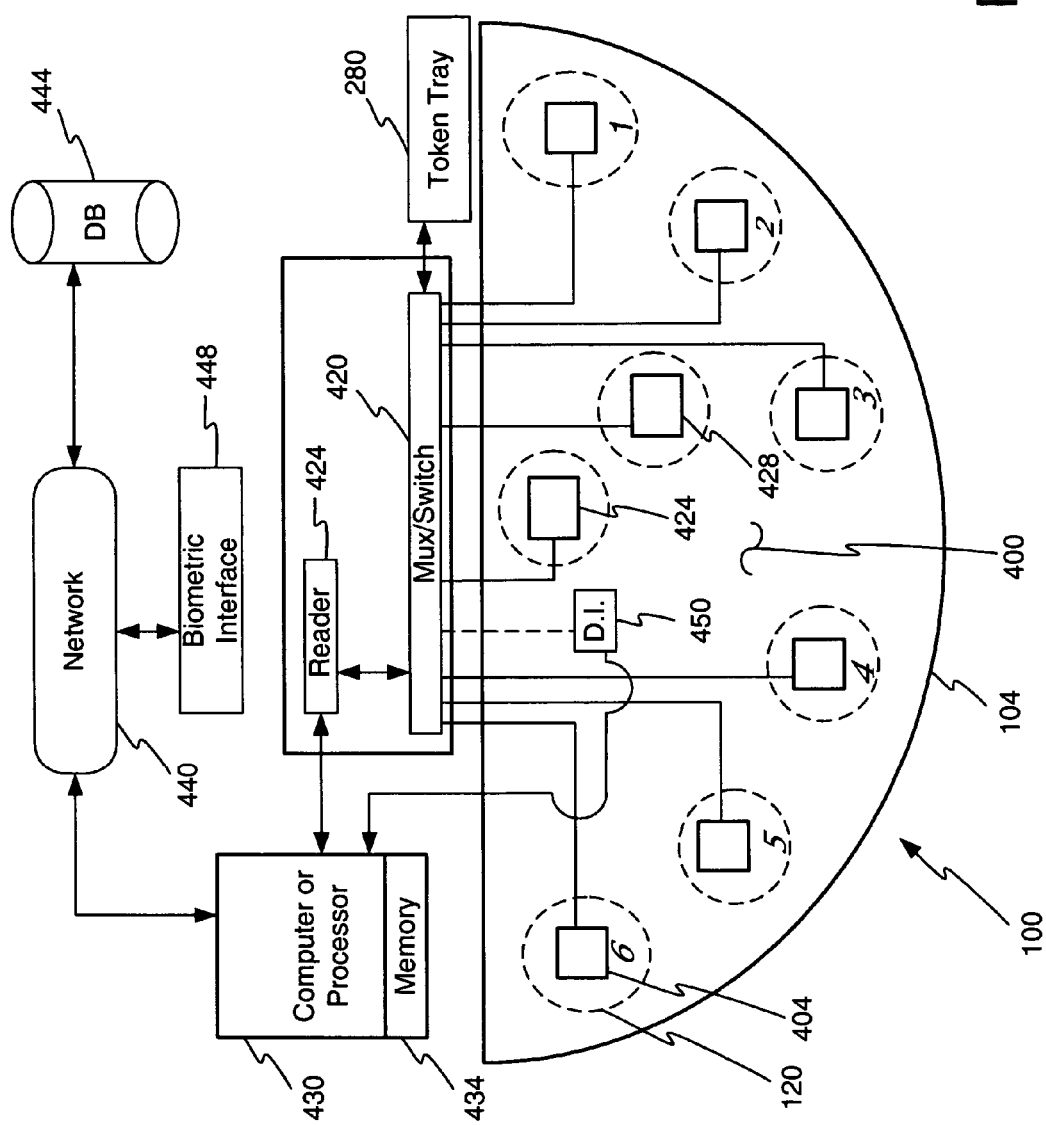
FIG. 4 illustrates a block diagram of a detection system in connection with a game table.
Figure 5A:
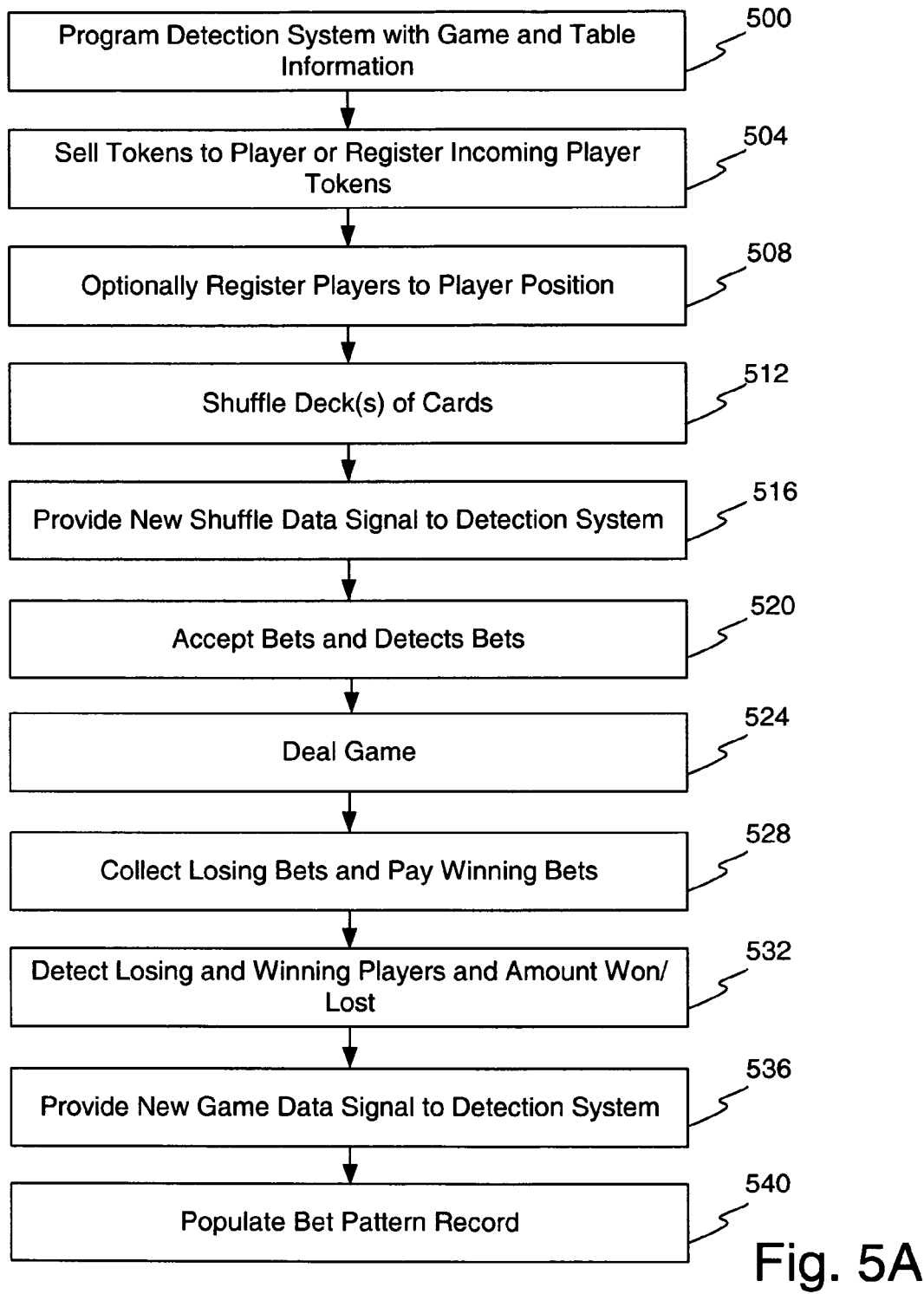
FIGS. 5A and 5B illustrate an operational flow diagram of an example method of operation of one example embodiment.
Figure 5B:
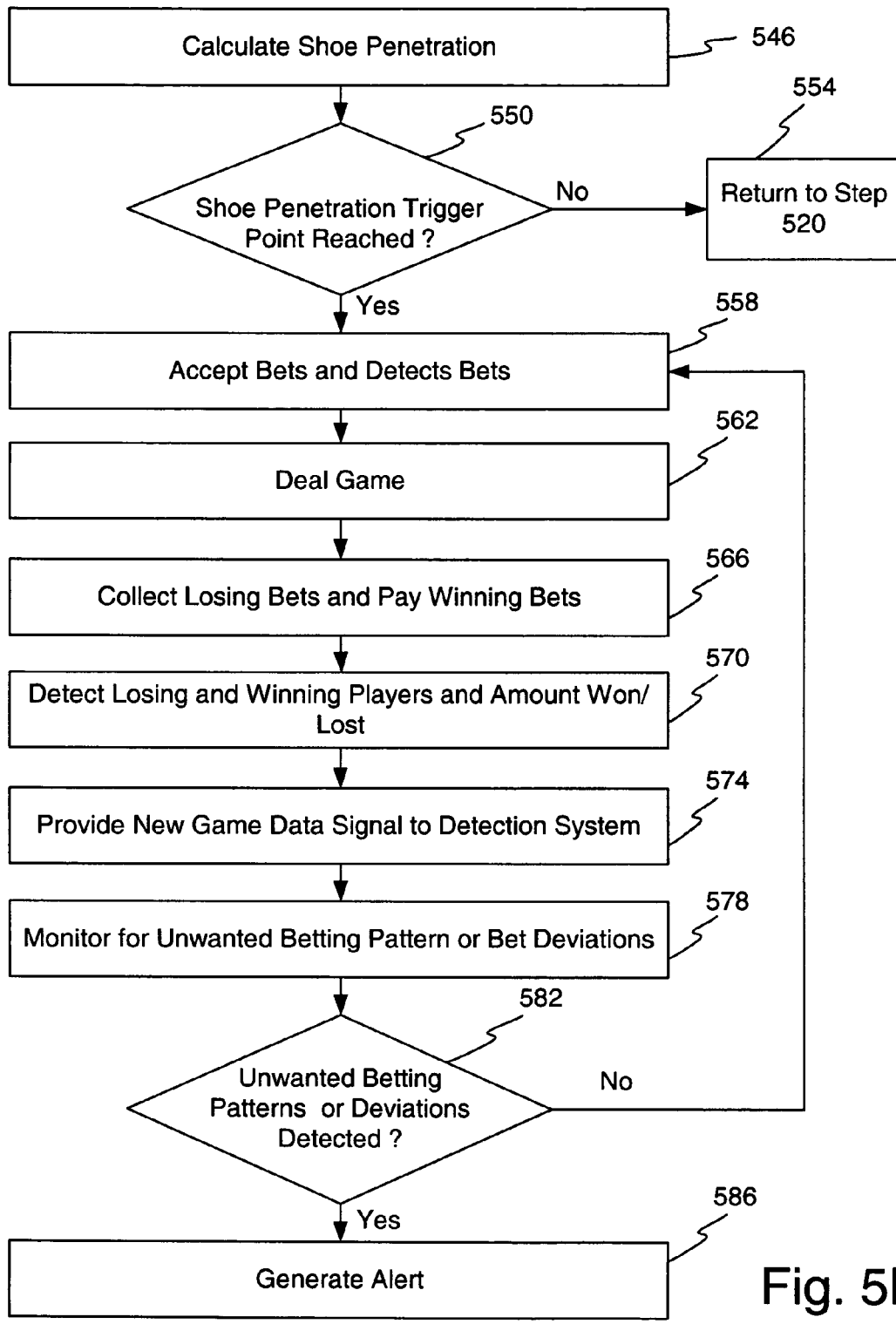

FIG. 4 illustrates a block diagram of the detection system in connection with a game table. This is but one possible example configuration and the elements as shown are for purposes of discussion and hence are not to scale. An underside 400 of the table 100. As way of reference, the outer surface 104 and players positions 1-6 are shown. A DID antenna 404 may be mounted below the table 100, be integral with the table, or on the top of the table. In this embodiment the DID antenna 404 is below or on the underside 400 of the table and creates a detection zone 120 when so instructed by the detection system describe above. The detection zone 120 may also be understood as the area in which the energy emitted by the antenna energizes the DID define of the token.

The DID antenna 404 connects to a multiplexer or switch 420, which in this embodiment controls communication between a reader 424 and the antenna 404. It is contemplated that communication between the reader 424 and the one or more antenna 404 is bi-directional such that the reader may provide an electrical excitation signal to the antenna 404. The antenna 404 provides energy in the form of radio waves within the detection zone. Any DID within the detection zone will couple the energy from the antenna and convert the energy to a usable form. As a result and in response to the excitation signal from the reader to the antenna, the antenna may also detect data emitted from the DID device. The data is sent back, via the multiplexer 420, to the reader 424.

A token tray 280 may also be provided that reads and/or writes incoming and/or outgoing tokens. This provides the monitoring system with and indication of tokens purchased by players and tokens collected by players. This allows the system to further track incoming and outgoing tokens. Tokens purchased by a player and not passing through the token tray 280, i.e. won or cashed in, may be assumed to have left with or been kept by the player. Tokens presented for play on the table that do not pass through the token tray 280 can be assumed to have been brought to the table by the player.

Operation of the other DID antenna associated with the other player stations occurs as described above. A dealer DID antenna 424 is also provided with the associated detection zone. One or more secondary bet or token spot antenna 428 with associated detection zone is also provided as shown. These elements 424, 428 also connect to the multiplexer/switch 420. Hence, the reader 424 may selectively read the DID information contained within the tokens placed at the bet spots as shown in FIG. 1 during the course of game play. A device other than a multiplexer may be used to concurrently energize more than one antenna to speed the read process. A dealer interface 450 also connects to monitoring system, such as to a computer 430, or via the multiplexer 420 to thereby provide input to the computer 430, such as shuffle and new game data or indication signals.

The reader 424 connects to any type processor which may be embodied in a computer 430 having memory 434. The computer is configured to execute machine readable code which may be stored on the memory 434. The machine readable code may comprise software code or code logic capable of interaction with other systems, such as the reader. The computer 430 may include an input interface for receiving input from a user, such as a keyboard, analog dial, potentiometer, mouse, touch screen, or any other device capable of providing information to and from the computer. In one embodiment the computer is accessible by a pit boss. The computer 430 may also be configured with one or more displays. The computer 430 may be configured to accept the input of information by pit supervisory personnel which include the following: the minimum bet at the table; the number of decks of cards used for traditional table games capable of using multiple decks of cards such as blackjack; and a sensitivity input to adjust the sensitivity of the system in regards to detecting sophisticated techniques by players such as card counting in blackjack to obtain an advantage. In other embodiment additional inputs may be accepted.

In the embodiment shown in FIG. 4, the computer 430 connects to a network 440 which in turn may connect to a database 444 and/or a biometric interface 448. A database 444 is generally understood in the art as an accessible memory for storing accessible data. The network 440 may include access by surveillance personnel in the casino.

The biometric interface 448 comprises any type system configured to monitor and identify players based on one or more player characteristics. In one such configuration a camera is capable of capturing a player's picture, such as of their face, and the biometric system compares the player's picture to a data base of known dishonest players or banned individuals. The biometric system 448 in connection with the bet detection system may be utilized to monitor for and identify certain players that may be attempting to gain an unfair advantage. One exemplary biometric system is available from Biometrica Systems, Inc in Las Vegas, Nev.

It is also contemplated that the computer 430 and the network 440 may be equipped to send and receive e-mail or another form of electronic output. In one embodiment, the detection system, such as the computer 430, the network 440, or a mail server associated with the network may be controlled to send e-mail, voice messages, or other notification to a party to alert or notify them of information generated by the detection system.

In operation, the system shown in FIG. 4 operates to monitor tokens on the table and, in one embodiment, bets placed by the one or more players. The token information is provided to the computer, processed in the manner described below, and output to a dealer, pit supervisory personnel, surveillance, casino hosts, or other third party. The bet detection system may be configured in any desired manner, but in one embodiment is configured to detect players attempting to obtain an unfair advantage in blackjack, or any other game, by adjusting their bets when the deck or deal is in their favor. In other embodiments, as discussed herein, the detection system may be utilized for other monitoring and reporting functions.

Although operation of a gaming table is generally understood, a brief description is provided with focus on operation of the detection system as shown in FIG. 1 and FIG. 4 and reference to other figures occurs to aid in understanding. After shuffling of one or more decks of cards by hand or through an automatic card shuffler such as the products sold by Shuffle Master, Inc. of Las Vegas, Nev., to insure fair and random game play, the dealer presses the shuffle button 208 of the dealer interface 150 to notify the detection system that dealing will occur from a newly shuffled deck or decks of cards dealt by hand or by a shoe. Likewise, to indicate the start of a new game, the dealer may press the game start button 216 to indicate the beginning of a new game. In the exemplary game of blackjack, a game ends after: (1) All players cease taking additional cards either by choice or by receiving a total of 21 or higher; and (2) The dealer receives a total of 21 or higher or stops taking additional cards according to preset rules. Alternatively, the use of the shuffle button may also indicate the beginning of a new game, but only a new game after a shuffle. At this stage, the one or more players may also be logged in to the detection system.

The dealer may then accept wagers, deal the cards to the players and conduct the game as would be understood. When a player places a bet at a player bet spot, one or more detectors, detect placement of the token placed within the detection zone. The detector provides this information to the detection system. Supplemental bets by the player may also be detected by the detection system. After completion of the game, the dealer may pay winning hands and the winning payouts may optionally be detected. Prior to the start of a new game, i.e. dealing of the cards, the dealer presses the game start button 216 to indicate to the detection system the start of a new game, and hence a new round of betting. Other input may be provided to the dealer interface or via other components of the detection system. Additional steps of operation are discussed below in connection with the figures that follow.

Game Data

To achieve desired operation and maintain system flexibility a user may populate the detection software, executing on the computer, with data regarding the game being played and one or more other parameters regarding the game. This system data or parameters may be changed to reflect the game in play (i.e. blackjack or Texas Hold'em BonuS™ for example) or the desired parameters that control operation of the detection software, such as the sensitivity of the detection system. This data may be input using the computer interface to suit the operator of the software and the detection system. The following provides a list of the parameters that may be entered into or stored into the systems. In other embodiment more or fewer items of data may be input.

Table Minimum—this data field defines the minimum bet accepted at the table.

Average Cards Per Hand Per Player—this data field defines the average number of cards dealt per player per hand. This value may be arrived at through known historical averages for each game and game variation. In one embodiment of a blackjack game this value comprises approximately 2.7 cards per player per hand but in other embodiments or other games, other values may be more selected or more accurate.

Maximum Bet—this data field defines the maximum bet accepted at the table.

Minimum Bet—this data field defines the minimum bet accepted at the table per player betting zone.

Number of Deck in Use—this data field defines the number of decks of cards used in the game. This is used to determine a deck penetration point at which card counting or a similar strategy may provide an unfair advantage to the player.

Play Lock-In Data—this data field defines or associates a player with a position at the table. In this manner, betting behavior and data is associated with not just a player position but also a player. In this manner, a player can be tracked as the player may move from table to table, from position to position, or over multiple days, weeks, or months of play. Any form of player tracking may be used. This field may be populated manually with a nickname, player tracking data using a card or other input means, or an actual name provided by the player. Biometric data may also be used to track a player.

Multiple Hand Players—this data field defines if and how to associate a player to multiple hands at the same table. If a player is playing multiple hands, then that same player may be associated to multiple player positions to accurately track play of the player.

Threshold Level Sensitivity Input—this data field defines the sensitivity or level at which the detection software and system generates a flag to dealer or manager. It is contemplated that this may be input using an analog dial, potentiometer, computer input, slider bar, numeric value, keyboard, or any other means. It is contemplated that the flexibility of the detection system to accommodate busy periods when a lower sensitivity may be desire, or slow periods, when a higher sensitivity may be desired. It is contemplated that sensitivity may be set on a player per player basis, a per table basis, a per pit basis, per time of day basis, or may be automatically adjusted based on the table minimum amount (i.e. increasing sensitivity when more money is being wagered). The sensitivity input preferably is one input of sensitivity (from low sensitivity to high sensitivity) for which the system uses in several calculations.

During game play, the system, in this example embodiment, obtains the following data from the dealer interface or other source. In other embodiments other data may be acquired.

Shuffle Signal—using the dealer interface the dealer may provide the shuffle signal to the detection software/hardware or an interface to allow an automatic card shuffler such as the products sold by Shuffle Master, Inc. of Las Vegas, Nev. to communicate new shuffle data. This indicates a freshly shuffled deck or decks of cards.

Bet Amount—the amount bet by a player is obtained by the DID antennas located to detect the DID units configured within the tokens that are within a detection zone of a bet spot. The location of a bet, which corresponds to a player position or other DID antenna location, is also provided to the detection software/hardware. Thus the detection system knows at which player position the bet was placed.

New Game Signal (hand count)—using the dealer interface the dealer may provide the new game signal to the detection software/hardware. This indicates a new game and hence a new round of betting and another deal of the cards.

During play the computer and detection software code (machine readable code) are active and interfacing (input/output) with the reader 424 and antenna to detect tokens within the detection zones. After a shuffle, the dealer utilizes the dealer interface to signal the detection system (software and/or hardware) that a new shoe is shuffled and ready. It can be assumed that a new game is also starting or the dealer may also press the new game button to indicate a new game is beginning. The players may place bets, which are detected by the antenna which are intermittently polling the detection zones to detect DID aspects of tokens.

Outputs

As a result of this method of play, the game data previously input into the system, and the processing by the computer and software executing thereof, the following outputs may be generated. Additional or fewer outputs may also be generated.

Maximum Bet Flags—The detection software/hardware may output information when a player has placed a bet in excess of the table maximum.

Winner Flags—The detection software/hardware may output information regarding which players are big winners, or have won an amount that is greater than a threshold value, either in a short term basis or over a long period of time. In the game of blackjack, there is an expected theoretical value of money (depending on rule variations) which a player will win or lose over a certain period of time depending how much money is wagered. In a certain percentage of time, the amount won or lost will fall within a range within the expected theoretical value. This range is measured by the standard deviation. In the game of blackjack, the amount won or lost will fall within one standard deviation approximately 68% of the time. Within two standard deviations the percentage would be approximately 95% of the time. Casino personnel such as pit supervisory personnel and surveillance need to be alerted to a player winning more than the threshold value because the player may be involved in a form of cheating. In the game of blackjack, this cheating could take the form of card bending or marking (marking certain cards so the player knows the dealer's hole card). This type of cheating is illegal and thus differentiated from card counting in the game of blackjack because card counting is generally a legal activity. However, in most jurisdictions like the State of Nevada for example, a casino is permitted to stop a card counting player from playing blackjack. Another form for which the player may gain an advantage over the house is to peek at the dealer's hole card. This is usually done with a team of people, one person may be behind the dealer and in a position to view the hole card when the dealer will peek to see if the hidden card (hole card) in combination of the top card (shown indicia) makes a twenty one in the game of blackjack. The team member playing on the table will take cues from the peeking member and will change play strategy based on if the dealer has a low card or high card as the hole card.

Big Bettors—The detection software/hardware may output information regarding which players are big bettors.

Small Bettors—The detection software/hardware may output information regarding which players are small bettors.

Loser Flags—The detection software/hardware may output information regarding which players are big losers either in a short term basis or over a long period of time. The loser flags may be determined using the same standard deviation as Winner Flags except that the purpose is different. Players who are poorly skilled gamblers help increase casino profits. For example, in the game of blackjack a player who follows a strategy which substantially differs from basic strategy would be a poorly skilled player. The Loser Flags would be used to alert casino hosts to allow the casino hosts to make sure that the poorly skilled player receives complimentary gifts such as meals, show tickets or rooms to keep the poorly skilled player playing at the casino.

Bet Deviation Flags—The detection software/hardware may output information when or which players are deviating their bets. This may be an indicator of a player attempting to gain an unfair advantage when the deck or decks are in their favor. As a result, by monitoring and outputting a flag when a player is deviating their bet at certain depths into the shoe, a bet deviation output alert flag may be generated and provided to the appropriate personal. In the game of blackjack, this flag may signal a potential card counter.

While the cards are being dealt and the games played, the detection system continues to monitor the wagers and may monitor winning and losing players to develop a bet pattern for a player over time. At the end of the game, the dealer provides input to the detection software signaling a new game, bets are placed, detected, and cards may be dealt. The detection system may also detect and monitor for supplemental and secondary bets during game play. The detection system may also detect and monitor multiple bets, required or optional, by a player in proprietary table games such as Caribbean Stud Poker®, Royal Match 21®, Three Card Poker™, and Texas Hold'em Bonus.™ Thus the detection software continues to receive inputs regarding wagers made by each player. After the number of cards dealt reach an established point within the total number of cards of available (hereinafter "Shuffle Point"), with the associated bet monitoring and new game input from the dealer via the dealer interface, the cards may require a re-shuffle. For example, in blackjack the dealer places a uniform colored plastic card approximately the same shape as a playing card at some point within the deck or decks of cards to indicate a re-shuffle point. Accordingly, the dealer re-shuffles the cards in any accepted manner and provides a re-shuffle signal to the detection software.

Based on the inputs provided to the detection software/hardware, the above-described outputs may be generated and provided to the appropriate personal. One such exemplary output that is particularly beneficial is the bet deviation flag. As discussed below in more detail, by comparing or detecting the point a player changes their bet in relation to the shoe penetration, a flag may be generated to alert the dealer, a manager, security, pit supervisory personnel, surveillance or other casino personal of the potential for unfair play or card counting in the case of blackjack. The notified party may then monitor the player or the player may be prevented from further play based only on the alert flag.

By way of example, if the player continually raises or lowers their bet during periods when the deck or decks of cards are mathematically more likely of being at an advantage to the player or at a disadvantage to the player then it is likely the player is engaged in unfair practices which in the case of blackjack would be card counting. In order to card count, a blackjack player must increase their bet when the cards remaining are such that the player has a theoretical positive advantage as opposed to the casino. Theoretically, in blackjack, the cards are in the player's favor approximately one third of the time depending on the number of decks used and the Shuffle Point.

The monitoring software/hardware may be configured to determine: (1) When the shuffle occurred; (2) The number of games played; (3) The cards dealt per hand by using a mathematical average; (4) The amount bet by each player on each hand; (5) Calculate when the deck or decks of cards are mathematically more likely is in a position for bet deviation, in relation to penetration, that may create an unfair player advantage. Accordingly, if an unfair player advantage is detected, such as card counting in blackjack, an alert flag or notification may be generated.

As an advantage to this system over prior art systems, in one embodiment the claimed method and apparatus avoids a reliance on card scanning equipment thereby reducing cost and complexity. Prior art systems that rely on card scanning to read the cards prior to and/or after dealing, and as the cards are dealt from the shoe may be undesirable. The card scan, and proposed by prior art methods, requires complex and expensive scanners, shoes, and scan processing equipment. Each piece of equipment added to a gaming table would require additional regulatory approval and expense. This system's advantage is that it is meant as an aid to casino personnel who are already in place to monitor traditional table games. The prior art systems do not replace these casino personnel who are already in place to monitor traditional table games.

Yet another advantage of this detection system is the ability to flag winning players and losing players as a result of monitoring the number of hands played and the amount bet. It is contemplated that in one embodiment, the pay out amounts paid to the player, based on a winning hand, may also be tracked by the monitoring system. For example, the detection software/hardware may monitor tokens moving from the token tray to the player as a result of winning bets. Likewise, players continual loss of tokens may also be monitored and logged as incoming to the monitored token tray. In either or both cases, the monitoring system may send alerts to a party that may provide complimentary gifts to the party to maintain them as a customer or to insure the party returns to the casino for additional wagering.

These various flags maybe sent to a manager, such as a pit supervisory personnel, a dealer, or other casino personnel such as, marketing, casino host, food or drink server, a security department, surveillance, camera person, or biometric personal. Notification may be made using any means available including but not limited to on screen alert, e-mail, voice mail, print out, flashing indicator, pagers, cell phone, and text messaging.

In one embodiment the method and apparatus described herein interfaces with an e-mail notification system configured to provide an e-mail notification to a wireless e-mail device, such as a Blackberry® type device. Consequently, immediate and detailed notification may be provided to any casino personal, without additional cost, using an existing system and interface.

Example Method of Output Generation

The following calculation process sets forth one possible method of calculating or generating flags, such as the bet deviation flag. In one embodiment, such as at the end of each shoe, at any time, or prior to a re-shuffle, the monitoring system may calculate the following data over the entire play of the player or for a different period of time.

The system may calculate the mode (statistical method of averaging which calculates the number used most frequently in a series of numbers) unit bet ("M"), which is defined as the amount of each actual bet rounded to the nearest multiple of table minimum. A bet that falls in between two multiples of table minimum would be rounded to the higher multiple. The rounding calculation is used to deter players from trying to trick the system in regards to their unit bet by using minor variations in their unit bet. By way of example, at a table having a $5 minimum bet, a $6 bet would be rounded to a $5 bet for processing by the detection system, a $9 bet would rounded to a $10 bet, a $7.50 bet would be rounded to a $10 bet. Rounding in this manner may or may not occur and is thus optional. Thus, M=mode average of the rounded actual bets. For example, if at a $5 minimum table a player makes bets of $6, $7, $15, $16, $16 and $18, then M would equal 15. Assuming application in a casino in the United States the 15 would be 15 dollars. This system recognizes the "M" value as fifteen units of currency whatever that unit may be. The unit could be units of chips, tokens or promotional prizes.

The system may next calculate the standard deviation of the unit win ("SD"). In one embodiment involving blackjack this may be calculated as=1.1× square root of number of hands played (i.e. the number of games played). In other embodiments a different equation may be used to calculate the standard deviation of the unit win.

The system may also be configured to calculate the expected range of win/loss ("ER") which is defined as the standard deviation times the median unit bet. Thus, ER=SD× M. The value ER defines the expected monetary range of units that a player can be expected to win and/or lose over time or during play.

The system may calculate the Weighted Expected Range ("WED") by using Threshold Level Sensitivity Input defined as variable Z. As described above, the value Z is a value set by a user, such as a dealer, surveillance or pit supervisory personnel, using the sensitivity input to control the sensitivity of the detection system. In the WED calculation, the "Z" value effectively controls the number of standard deviations for the range used to determine a Winner Flag or a Loser Flag. In one embodiment, the Z value is "1" when the sensitivity is set at medium, "2" when the sensitivity is highest, and "0.5" when the sensitivity is lowest.

In one embodiment the value WED is defined by $1/Z \times ER$. In one embodiment a value C1 and a value C2 are utilized to define the sensitivity, such as upper and lower boundaries.

In this example embodiment a comparator function ("C"), which may be determined for one or both of below or above WED. In this calculation, defined by the following equation, B is the buy in amount and A is the current amount of money held by the player at the time of calculation. These values may be determined in any manner including, but not limited to manual entry and detection by a DID antenna.

$$C1 = B + WED$$

$$C2 = B - WED$$

As a result of this processing by the detection system, if the value of C1 is greater than the value A, (C1>A) then the Winner Flag output is generated Similarly, if the detection system determines that the value of C2 is less than A (C2<A), then the system may generate the Loser Flag output.

In this example embodiment the value for deck penetration calculation trigger point is defined as DP and is adjustable by using "Z". Deck penetration defines how many cards have been dealt from the deck or the shoe and may be defined in relation to the total number of decks or cards in use. The term 'deck' as used in the term 'deck penetration' may mean any number of cards or decks of cards. Thus, 29% deck penetration would take into account the total number of cards in the shoe or number of decks in use. In one embodiment the value for DP defines when the system begins to monitor for deviations in the bet. The main purpose for optionally not monitoring deviations in the bet before the deck penetration point is because: mathematically in a card game it is less likely that the cards being dealt in the beginning of a deck or decks of cards will yield a situation that could determine a high advantage to the player. In the case of card counting in blackjack, this fact is especially true and in some card counting systems a high advantage would be termed a high positive count or a low ratio of cards which do not have a value of ten to those cards which do have a value of ten. In one embodiment, bet deviations are always monitored, but flags are generated after sufficient deck penetration.

In one example embodiment for the game of blackjack (standard deck of playing cards used in blackjack with no joker) this is calculated as follows:

$$DP=1/Z(\text{sensitivity input}) \times 0.29 \times (\text{number of decks} \times 52)$$

The number 0.29 is the approximated point in a set of cards where the player can have a greater than approximately a 50% chance of an advantage.

Furthermore, based on the average number of cards dealt to each player per hand, the Estimation of number of cards played ("CP") can be calculated after each game is played. This may be reset after each shuffle of the shoe. In the blackjack embodiment, the hand running total for the total number of players is determined using the hand running total of the number of players×2.7=CP wherein CP is defined as the cards played. To calculate when the trigger point has been reached a comparator function may be used. The trigger point may be defined as the point in the shoe at which the bet monitoring may occur or when flags may be generated. In other embodiments, the bet monitoring and flag generation may occur at any time. In one embodiment the system only tracks deviations in the bet after the trigger point and calculates the Winner Flag and Loser Flag at any time. If CP is greater than DP then deviations are monitored until the next shuffle whereby the process is repeated whereby monitoring occurs when CP is greater than DP again.

In this example embodiment, the detection software/hardware can be configured to calculate the Unit Bet Variation Calculation ("UBV"). In one embodiment for the game of blackjack, the UBV comprises a running total of the number of hands where the player has made a bet of twice or greater the rounded mode bet "M." The value M used is the value after each shuffle or UBV=the accumulated sum of the occurrences of 2×M (the median bet) after the DP has been reached. To illustrate by example, assume:

after the first shuffle M=10 units and the player bet 20 units or higher three times then UBV is 3;

after the second shuffle M=15 and the player bet 30 units or higher two times then the UBV becomes 5(number accumulates).

The detection software/hardware may be further configured to determine or calculate the determination of counting ("DOC") value. The DOC value may be considered, in one embodiment, a flag or alert of a card counter or other player attempting to utilize an unfair advantage during play. In one embodiment, a DOC comprises a comparator function. By way of example in a single deck blackjack game and not limitation, a positive DOC value, i.e. a flag or alert, may occur if the UBV>0.38 (1/Z)×(total number of hands played by the player). The number "0.38" represents the approximate percentage of time that it would be in the player's advantage to increase their bet. In a blackjack embodiment of the system, the system selects the appropriate formula based on the number of decks of cards used in the game (which is an input as described above). Other equations for other numbers of decks of cards in the blackjack embodiment:

Two Decks: $UBV>0.34(1/Z)\times$(total number of hands played by the player)

Four Decks: $UBV>.30(1/Z)\times$(total number of hands played by the player)

Six or more Decks: $UBV>.20(1/Z)\times$(total number of hands played by the player)

This is but one possible equation for calculating the DOC to thereby generate a flag, alert, or warning of a player using an unfair advantage. The number of decks used in the blackjack embodiment would be game data which is inputted.

This is but one possible example calculation method and set of equations for use by the detection software/hardware. It is contemplated that one of ordinary skill in the art, after reading the disclosure contained above and the following claims, may arrive at other methods and apparatus for processing by the detection software/hardware.

While various embodiments of the invention have been described, it will be apparent to those of ordinary skill in the art that many more embodiments and implementations are possible that are within the scope of this invention.

What is claimed is:

1. A system for monitoring player betting during play of a table game comprising:
   one or more bet spots configured to receive a bet;
   one or more antenna associated with one or more bet spots, the one or more antenna capable of detecting a bet within a detection zone;
   a dealer interface configured to accept input from a dealer to create game data;
   a reader configured to receive one or more signals from the one or more antenna;
   a processor configured to receive the one or more signals from the reader and the game data, and further configured with memory having machine readable code comprising:
   machine readable code configured to determine deck penetration based on the game data from the dealer and an average number of cards dealt dealt per hand, wherein the average number of cards dealt per hand is based on a historical average;
   machine readable code configured to determine betting patterns for one or more players based on the one or more signals from the reader;
   machine readable code configured to detect changes in betting patterns for one or more players in relation to the deck penetration; and
   machine readable code configured to generate a flag in response to changes in betting patterns for one or more players in relation to the deck penetration.

2. The system of claim 1, wherein the dealer interface comprises a shuffle button and a new game button operated by the dealer.

3. The system of claim 2, wherein the dealer interface further comprises a player tracking interface.

4. The system of claim 1, wherein the bet is placed using a token configured with radio frequency identification.

5. The system of claim 1, wherein the deck penetration is determined based on a number of players per game multiplied by a number of games since shuffle multiplied by average number of cards dealt per player per game.

6. The system of claim 1, wherein the machine readable code rounds a bet to a multiple of a table minimum.

7. The system of claim 1, wherein the table game is the game of blackjack.

8. The system of claim 1, wherein the dealer interface receives input from an automatic card shuffler.

9. A bet detection system for use with a table game comprising:
   one or more antenna for receiving token data from two or more DID equipped tokens;
   a dealer interface for generating game data;
   a processor configured execute machine readable code to process the token data and the game data, the machine readable code comprising:
   machine readable code configured to deck penetration using the game data and an average number of cards dealt per hand, wherein the average number of cards dealt per hand is based on a historical average;
   machine readable code configured to track a player's bet deviation; and
   machine readable code configured to compare a player's bet deviation to a threshold value responsive to the deck penetration.

10. The system of claim 9, wherein the token data comprise a token value.

11. The system of claim 10, wherein the token value has a value in a currency.

12. The system of claim 9, wherein the one or more antenna are configured to send an excitation signal and receive a response from the DID equipped tokens.

13. The system of claim 9, wherein the deck penetration is based on the mathematical calculation of a number of players per game multiplied by a number of games since shuffle multiplied by the average of the number of cards dealt for each hand.

14. The system of claim 9, wherein the player's bet deviation comprises variations from the player's average bet.

15. The system of claim 9, wherein the player's bet deviation comprises variations from the player's average bet calculated after a predetermined deck penetration.

16. The system of claim 9, wherein the game data comprises data indicating a new game and data indicating a shuffle.

17. A method for monitoring for unwanted betting patterns during one or more wagering events on a table game comprising:

detecting one or more bet amounts of one or more bets by one or more players;

receiving game data from the dealer via a dealer interface;

processing the bet amount and the game data via a processor to determine a bet amount pattern for at least one of the one or more players;

processing at least the game data via the processor to determine deck penetration based on the game data and an average number of cards dealt per hand, wherein the average number of cards dealt per hand is based on a historical average; and processing the bet amount pattern for at least one player in relation to deck the penetration via the processor to detect unwanted betting patterns by at least one player.

18. The method of claim 17, wherein detecting the one or more bet amounts comprises reading data from a RFID equipped token.

19. The method of claim 17, wherein the game data comprises data regarding number of hands dealt since last shuffle.

20. The method of claim 17, wherein processing at least the game data to determine the deck penetration comprises processing the following data: average cards dealt per hand, number of players dealt hands per game, and the number of games.

21. The method of claim 17, further comprising generating and sending an electronic alert to signal one or more casino personal about the unwanted betting pattern.

22. The method of claim 17, wherein some game data is received from an input from an automatic card shuffler.

23. The method of claim 17, further comprising identifying at least one player.

24. The method of claim 23, wherein the method to identify at least one player includes the use of card which contains information identifying at least the player's name.

25. The method of claim 23, wherein the method to identify at least one player comprises the use of a biometric method of identifying players.

26. The method of claim 25, further comprising a method of comparing a player's biometric information against biometric information of player's whom a casino seeks to exclude from playing table games.

27. A method for monitoring betting during play of wagering events on a table game comprising:

providing a wagering event using DID tokens and a DID token detecting gaming table interfaced to a detection system having machine readable code configured to process signals generated by DID token reading;

tracking DID tokens bet during play via a processor and associating DID tokens bet with a particular player;

calculating via a processor one or more types of player wagering data from the tracking of DID tokens comprising:

total amount bet during game play;

total amount lost during game play;

total amount won during game play;

determining deck penetration using an average number of cards dealt per hand, wherein the average number of cards dealt per hand is based on a historical average;

comparing the player wagering data to one or more thresholds in relation to the determined deck penetration;

responsive to the comparing, generating one or more notifications regarding the player wagering data; and automatically electronically sending one or more notifications regarding the comparing of player wagering data to the one or more thresholds when the player wagering data meets the one or more thresholds.

28. The method of claim 27, wherein DID tokens comprise tokens equipped with radio frequency identification capability.

29. The method of claim 27 wherein tracking DID tokens provided to a player from a dealer comprises providing DID tokens, from a token tray configured to read DID tokens, to a player.

30. The method of claim 27, wherein automatically electronically sending comprising sending the one or more notifications using e-mail messages sent via a wireless communication link.

31. The method of claim 30, wherein the person notified depends on the type of notification.

32. The method of claim 31, wherein for a player identified as poorly skilled, a casino host is notified.

33. The method of claim 27, wherein a gaming regulatory agency has direct access to any notifications.

34. The method of claim 27, wherein automatically electronically sending comprising displaying an alert on a computer screen.

35. The method of claim 27, wherein sending the one or more notifications comprises sending one or more of the following notifications: a notification of a player with large winnings, a player with large losses, or a player with large bets.

36. The method of claim 27, further comprising a method of tracking DID tokens provided to a player from a dealer.

37. The method of claim 27, further comprising tracking DID tokens collected from the player by the dealer.

38. The method of claim 27, wherein the table game is blackjack.

39. The method of claim 27, wherein the table game is a proprietary table game.

* * * * *